United States Patent
Stephenson et al.

(10) Patent No.: US 9,683,499 B2
(45) Date of Patent: Jun. 20, 2017

(54) OPTIMIZING DIESEL FUEL CONSUMPTION FOR DUAL-FUEL ENGINES

(71) Applicant: Halliburton Energy Services, Inc., Houston, TX (US)

(72) Inventors: Stanley V. Stephenson, Duncan, OK (US); Andrew James Summers, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 202 days.

(21) Appl. No.: 14/406,010

(22) PCT Filed: Feb. 26, 2014

(86) PCT No.: PCT/US2014/018584
§ 371 (c)(1),
(2) Date: Dec. 5, 2014

(87) PCT Pub. No.: WO2015/130272
PCT Pub. Date: Sep. 3, 2015

(65) Prior Publication Data
US 2016/0265457 A1    Sep. 15, 2016

(51) Int. Cl.
*F02D 19/06*    (2006.01)
*F02B 3/06*    (2006.01)
(Continued)

(52) U.S. Cl.
CPC ............ *F02D 41/0025* (2013.01); *F02B 9/02* (2013.01); *F02B 43/02* (2013.01);
(Continued)

(58) Field of Classification Search
CPC ............ F02M 21/0215; F02M 21/0064; F02D 41/0025; F02D 41/0027; F02D 19/08;
(Continued)

(56) References Cited

U.S. PATENT DOCUMENTS 5,370,097 A * 12/1994 Davis .................. F02D 19/0631
123/27 GE
5,937,800 A * 8/1999 Brown ..................... F02B 7/06
123/27 GE
(Continued)

FOREIGN PATENT DOCUMENTS

EP        0102119 A1    3/1984
KR   1020040095274 A   11/2004
(Continued)

OTHER PUBLICATIONS

International Search Report and Written Opinion for PCT/US2014/018584 dated Nov. 6, 2014.

*Primary Examiner* — Lindsay Low
*Assistant Examiner* — George Jin
(74) *Attorney, Agent, or Firm* — McDermott Will & Emery LLP

(57) ABSTRACT

Systems and methods may be configured to monitor, calculate, and optimize diesel fuel consumption for dual-fuel engines. For example, a method may include performing a well site operation at first operating parameters with a dual-fuel engine configuration operating at first engine parameters, wherein the dual-fuel engine configuration comprises one or more dual-fuel engines; changing the first operating parameters to second operating parameters and the first engine parameters to second engine parameters; determining a maximum natural gas substitution percentage in a fuel comprising a natural gas/diesel mixture for at least one of the dual-fuel engines at the second operating parameters and the second engine parameters; and changing a fuel composition supplied to the at least one of the dual-fuel engines based on the maximum natural gas substitution percentage.

15 Claims, 6 Drawing Sheets

(51) Int. Cl.
*F02D 41/00* (2006.01)
*F02B 43/02* (2006.01)
*F02B 9/02* (2006.01)
*F02B 43/12* (2006.01)
*F02D 19/10* (2006.01)
*E21B 7/00* (2006.01)
*E21B 33/13* (2006.01)
*E21B 43/25* (2006.01)

(52) U.S. Cl.
CPC ............ *F02D 19/0642* (2013.01); *E21B 7/00* (2013.01); *E21B 33/13* (2013.01); *E21B 43/25* (2013.01); *F02B 43/12* (2013.01); *F02D 19/10* (2013.01); *F02D 2200/0611* (2013.01); *F02D 2200/0625* (2013.01); *Y02T 10/36* (2013.01)

(58) Field of Classification Search
CPC .... F02D 19/066; F02D 19/0642; F02D 19/10; F02D 19/105; F02D 19/021; F02D 19/061; F02D 19/0639; F02D 2200/0611; F02D 2200/0625; F02D 29/06; F02D 2250/24; F02B 7/06; F02B 7/08; F02B 9/02; F02B 43/00; F02B 43/02; F02B 43/12; F02B 2043/103; G05B 13/00; H02J 9/00

USPC .... 123/27 GE, 575, 299, 525; 700/297, 295; 307/19, 48

See application file for complete search history.

(56) References Cited

U.S. PATENT DOCUMENTS

| | | | |
|---|---|---|---|
| 6,202,601 B1* | 3/2001 | Ouellette | F02B 1/12 123/27 GE |
| 2002/0007805 A1* | 1/2002 | Green | F02B 3/06 123/27 GE |
| 2012/0292992 A1* | 11/2012 | Williams | F02D 19/10 307/23 |
| 2014/0222317 A1* | 8/2014 | Norton | F02D 29/02 701/104 |
| 2015/0005975 A1* | 1/2015 | Di Cristofaro | G05B 15/02 700/297 |

FOREIGN PATENT DOCUMENTS

| WO | WO03/076788 A1 | 9/2003 |
|---|---|---|
| WO | 2015130272 A1 | 9/2015 |

* cited by examiner

OPTIMIZING DIESEL FUEL CONSUMPTION FOR DUAL-FUEL ENGINES

BACKGROUND

The present disclosure relates to systems and methods for monitoring, calculating, and optimizing diesel fuel consumption for dual-fuel engines.

The performance of operations at a well site entails various steps, each using a number of devices. Many well site operations entail pumping one or more treatment fluids into the subterranean formation. For example, drilling operations play an important role when developing oil, gas or water wells or when mining for minerals and the like. During the drilling operations, a drill bit passes through various layers of earth strata as it descends to a desired depth to drill a wellbore. During the drilling process, a drilling fluid may be pumped through the drill string into the wellbore, among other reasons, to circulate drill cuttings out of the wellbore to the surface and/or to cool the drill bit or other downhole equipment.

In another example, hydraulic fracturing operations are often used to increase the production of desired fluids (e.g., hydrocarbons, water, etc.) from a formation of interest. In hydraulic fracturing operations, a fracturing fluid is pumped into a wellbore that penetrates a subterranean formation at a sufficient hydraulic pressure to create or enhance one or more cracks, or "fractures," in the subterranean formation. The creation and/or enhancement of these fractures, among other things, may enhance the flow of fluids through the subterranean formation so that they may be produced out of the subterranean formation more readily. In another example, downhole cementing operations typically involve the mixing and pumping of large volumes of cement into a wellbore, among other purposes, to prepare the wellbore for the production of fluids.

In these and other well site operations, engine-driven motorized equipment (e.g., pumps, drilling motors, blenders, conveyers, and the like) may be used to perform a variety of tasks related to constructing, completing, and maintaining the well site and/or producing fluids from the well. The operation of this equipment often requires large amounts of fuel, which may be costly to procure, transport, and maintain at a well site.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to systems and methods for monitoring, calculating, and optimizing diesel fuel consumption for dual-fuel engines.

As used herein, the term "dual-fuel engine" refers to an engine that can run on 100% diesel or a mixture of natural gas and diesel.

The methods and systems of the present disclosure may use a diesel consumption model that calculates the amount of diesel fuel consumed by motorized equipment having a dual-fuel engine. Diesel fuel consumption may be analyzed before, during, and/or after a well site operation with the diesel consumption models described herein. The methods and systems of the present disclosure may, among other benefits, allow operators to determine which equipment (and corresponding dual-fuel engine configurations of one or more dual fuel engines) and which engine operating parameters (also referred to herein as engine parameters) reduce the amount of fuel, especially diesel fuel, used in a well site operation.

For example, the diesel consumption model may be used in or near real-time at a well site, which may permit operators (or computer equipment) to adjust engine parameters to further refine and optimize a dual-fuel engine's fuel consumption. The methods and systems of the present disclosure also may allow more accurate estimations of the amount of fuel needed for a particular well site operation in advance, which may reduce costs associated with procuring, transporting, and storing fuel at a well site. Generally, these and other benefits of the methods and systems of the present disclosure may permit operators to conduct well site operations in a more efficient, cost-effective manner.

Figure 1:
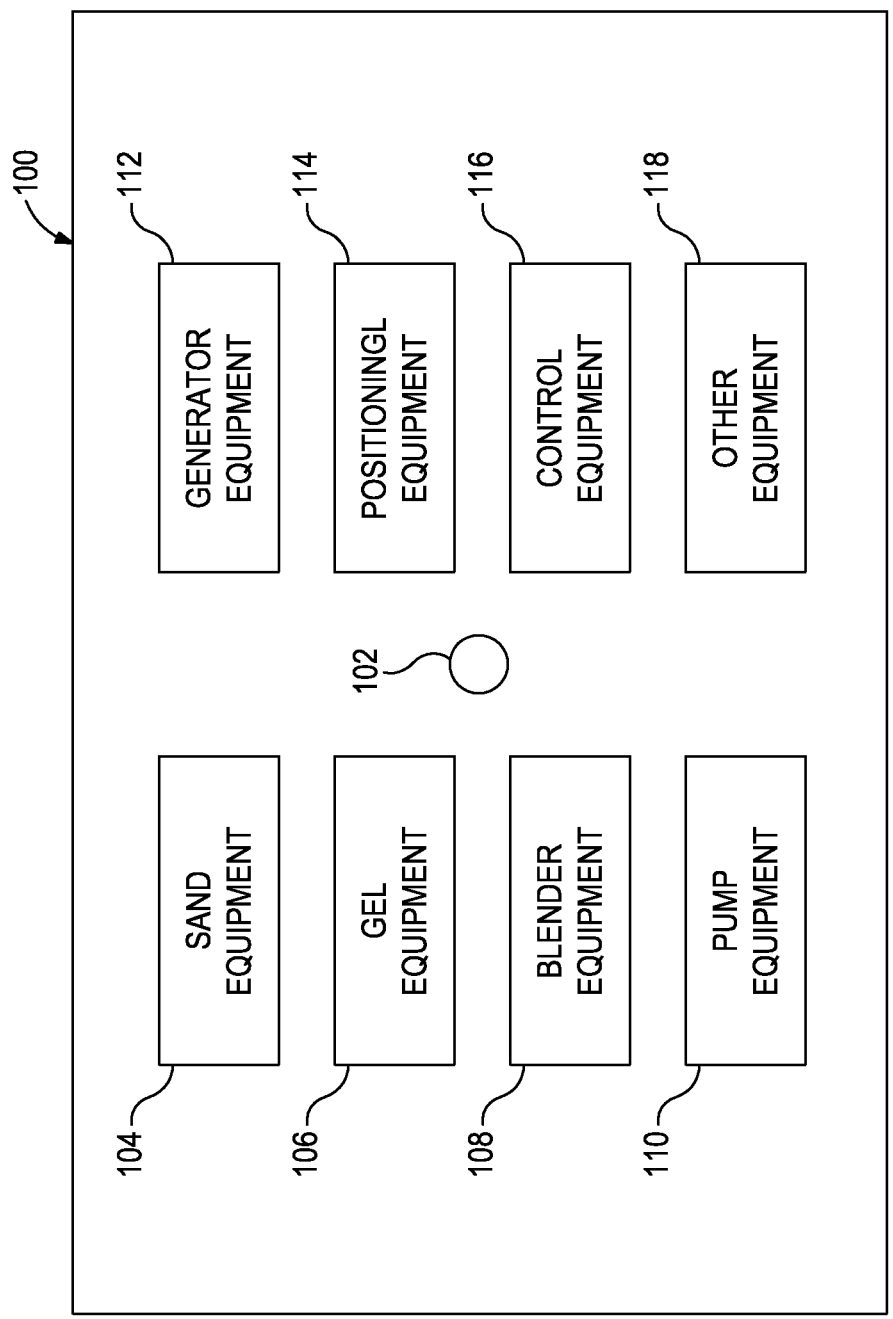
FIG. 1 is a diagram illustrating a well site that includes various dual-fuel engines suitable for use in conjunction with the diesel consumption models described herein.

FIG. 1 illustrates a job site 100 in accordance with one aspect of the present disclosure. The job site 100 may comprise a well 102 or other suitable structure at which equipment may be used to perform a well site operation. Other types of sites may include, for example, a construction site. The equipment may include one or more dual-fuel engines that consume fuel to perform tasks at the site 100. The well 102 may be a hydrocarbon or other well for producing oil, gas, and/or other resources. In some embodiments, the well site operation being performed at the well site may include, but is not limited to, a cementing operation, a gravel packing operation, a stimulating operation (e.g., fracturing, acidizing, or both), a drilling operation, or other suitable well site operation where equipment is used to drill, complete, produce, enhance production, and/or work over the well 102. Other well site operations may include, for example, operating or construction of a facility.

In exemplary embodiment wherein the job site is the site of a subterranean well, the equipment at the job site 100 may include, but is not limited to, sand equipment 104, gel equipment 106, blender equipment 108, pump equipment 110, generator equipment 112, positioning equipment 114, control equipment 116, other equipment 118, and the like, and any combination thereof. The equipment may be, for example, truck or rig-mounted equipment. The sand equipment 104 may include transport trucks for hauling to and storing at the site 100 sand for use in the job. The gel equipment 106 may include transport trucks for hauling to and storing at the site 100 materials used to make a gel for use in the job. The blender equipment 108 may include blenders, or mixers for blending materials at the site for the job. The pump equipment 110 may include pump trucks for pumping materials down the well 102 for the job. The generator equipment 112 may include generator trucks for generating electric power at the site 100 for the job. The electric power may be used by sensors, control and other equipment. The positioning equipment 114 may include earth movers, cranes, rigs or other equipment to move, locate or position equipment or materials at the site 100 or in the well 102.

The control equipment 116 may, in some embodiments, comprise any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, or other purposes. For example, the controller may be a personal computer, a network storage device, a network terminal, or any other suitable device and may vary in size, shape, performance, functionality, and price. The control equipment 116 may include an instrument truck coupled to some, all, or substantially all of the other equipment at the site 100 and/or to remote systems or equipment.

In some instances, the control equipment 116 may include one or more processing resources such as a central processing unit (CPU) or hardware or software control logic. The control equipment 116 may include a special purpose computer programmed to perform the functions described herein. Any suitable processing application software package may be used by the controller to process the data. Examples of special purpose computer systems programmed to perform these functions include, but are not limited to, those used in the SENTRY™ and INSITE™ services and systems provided by Halliburton Energy Services, Inc. The control equipment 116 may be connected by wireline or wirelessly to other equipment to receive data for or during the job. The data may be received in or near real-time or otherwise. In another embodiment, data from or for equipment may be keyed into the control equipment 116.

In some embodiments, the control equipment 116 may be coupled to or include a memory that contains the programs to be executed as the control equipment 116 performs its functions as well as constants and variables used to perform those functions. The control equipment 116 may be coupled to or include one or more input/output devices 224, such as a keyboard, a mouse, a monitor or display, a speaker, a microphone, or an external communications interface. The control equipment 116 also may include one or more buses operable to transmit communications between the various hardware components. In certain embodiments, the control equipment 116 produces data that may be presented in a variety of visual display presentations such as a display communicatively coupled to or included in control equipment 116. The data may be presented to the user in a graphical format (e.g., a chart, a graph, a plot, or the like) or in a textual format (e.g., a table of values). In some instances, the display may show warnings or other information to the operator when the control equipment 116 detects a particular condition amount.

The control equipment 116 may, in some instances, be located on one or more pieces of equipment at the site 100, on an instrument truck located at the site 100, or at a remote location. Each piece of equipment at site 100 may include its own control equipment 116, or multiple pieces of equipment at the site 100 may share common control equipment 116. In certain embodiments where certain pieces of equipment at the site 100 include or are coupled to their own control equipment 116 in accordance with the present disclosure, that equipment may be operated so as to minimize fuel consumption on any individual unit, while other pieces of equipment may be run traditionally. In other embodiments, multiple pieces of equipment or all of the equipment at the site 100 may include or be coupled to control equipment 116 in accordance with the present disclosure, and may be operated so as to minimize the total fuel consumption for the multiple pieces of equipment.

The control equipment 116 also may be communicatively coupled to a network, such as a local area network or the Internet, either directly or through one or more input/output devices (e.g., an external communications interface). In certain embodiments, such a network may permit the data from the control equipment 116 to be remotely accessible by any computer system communicatively coupled to the network via, for example, a satellite, a modem, or wireless connections. As would be appreciated by those of ordinary skill in the art, with the benefit of this disclosure, a controller and/or computer system communicatively coupled to control equipment 116 also may collect data from multiple well sites and/or wells to perform quality checks across a plurality of wells. The control equipment 116 also may be communicatively coupled to, for example, a remote real time operating center whereby the remote real time operating center is able to send and/or receive data from the control equipment 116. In certain embodiments, the data may be pushed at or near real-time enabling real-time communication, monitoring, and reporting capability. This may, among other benefits, allow an operator to continuously monitor fuel consumption at a job site, and allow the collected data to be used in a streamline workflow in a real-time manner by other systems and operators concurrently with acquisition.

The terms "couple" or "couples," as used herein, refer to either an indirect or a direct connection. Thus, if a first device couples to a second device, that connection may be through a direct connection, or through an indirect connection via other devices and connections. The term "communicatively coupled" as used herein is intended to mean coupling of components in a way to permit communication of information therebetween. Two components may be communicatively coupled through a wired or wireless communication network, including but not limited to Ethernet, LAN, fiber optics, radio, microwaves, satellite, and the like. Operation and use of such communication networks is well known to those of ordinary skill in the art and will, therefore, not be discussed in detail herein. The other equipment 118 may comprise equipment also used by or at the job or ancillary to the job. For example, the other equipment 118 may comprise personal or other vehicles used to transport workers to the site 100 but not directly used at the site 100 for the job.

During equipment operation, tasks performed by the dual-fuel engine consume fuel. The dual-fuel engine may be operated at idle, at full horsepower, or at other suitable loads. Examples of dual-fuel engines that may be suitable in the methods, well site operations, and systems of the present disclosure may include engines commercially available from suppliers such as Caterpillar (Peoria, Ill.), Cummins, Inc. (Columbus, Ind.), MTU (Freidrechshafen, Germany), and others. During a well site operation, data may be estimated, monitored, or otherwise collected from the equipment, stored, and used in or near real-time or otherwise to determine the amount of fuel being consumed by the dual-fuel engine. In some instances, the data may be from sensors coupled to the equipment or engines of the equipment and uploaded to an instrument truck or other suitable data gathering and storage device at the job site (e.g., control equipment 116 in FIG. 1), or may be transmitted to a suitable data gathering and storage device at an offsite location.

In some embodiments before performing a well site operation, a diesel consumption model described herein may be used to calculate a diesel consumption value for a dual-fuel engine configuration (i.e., a dual-fuel engine or a combination of dual-fuel engines) operated with a desired fuel. As used herein, the term "diesel consumption value" refers to a value that indicates the amount of diesel consumed. A diesel consumption value may be reported as, for example, an absolute amount of diesel consumption, a rate of diesel consumption, and the like.

Calculating a diesel consumption value may involve first calculating a fuel consumption value by inputting (1) operational parameters, (2) the model of the dual-fuel engine configuration, and (3) engine parameters (e.g., operating gear, engine speed, and the like, for each dual-fuel engine) into a diesel consumption model that calculates the fuel consumption value (e.g., an absolute fuel consumption or a fuel consumption rate). Examples of operational parameters depend on the task/operation of interest. For example, in pumping fluids the operational parameters may include, but are not limited to, a pressure, a pump rate, a pump time, a value indicating pump time relative to idle time (e.g., an idle time or an idle factor), and the like. The diesel consumption model may use the foregoing inputs to estimate the performance of each dual-fuel engine (e.g., hydraulic horsepower ("HHP"), brake horsepower ("BHP"), pump rate, and the like) taking into account both idle and active time to finally calculate the fuel consumption value for the dual-fuel engine configuration.

By way of nonlimiting example, a diesel consumption model may be designed as follows for pumps as the motorized equipment. HHP may be calculated from the operating parameter inputs with the following formula: wellbore pressure (units: psi) times pump rate (units: gallons per minute) divided by 1714 (conversion factor for HHP units of horsepower). Further, a plot with curve fit of fuel consumption rate versus BHP (data measured experimentally) at various engine speeds provides a horsepower unit fuel consumption rate (slope) and an internal parasitic fuel consumption rate (y-intercept) at various engine speeds. Then, fuel consumption values (rate or absolute values) for idle and active (e.g., pumping) may calculated.

Figure 2:
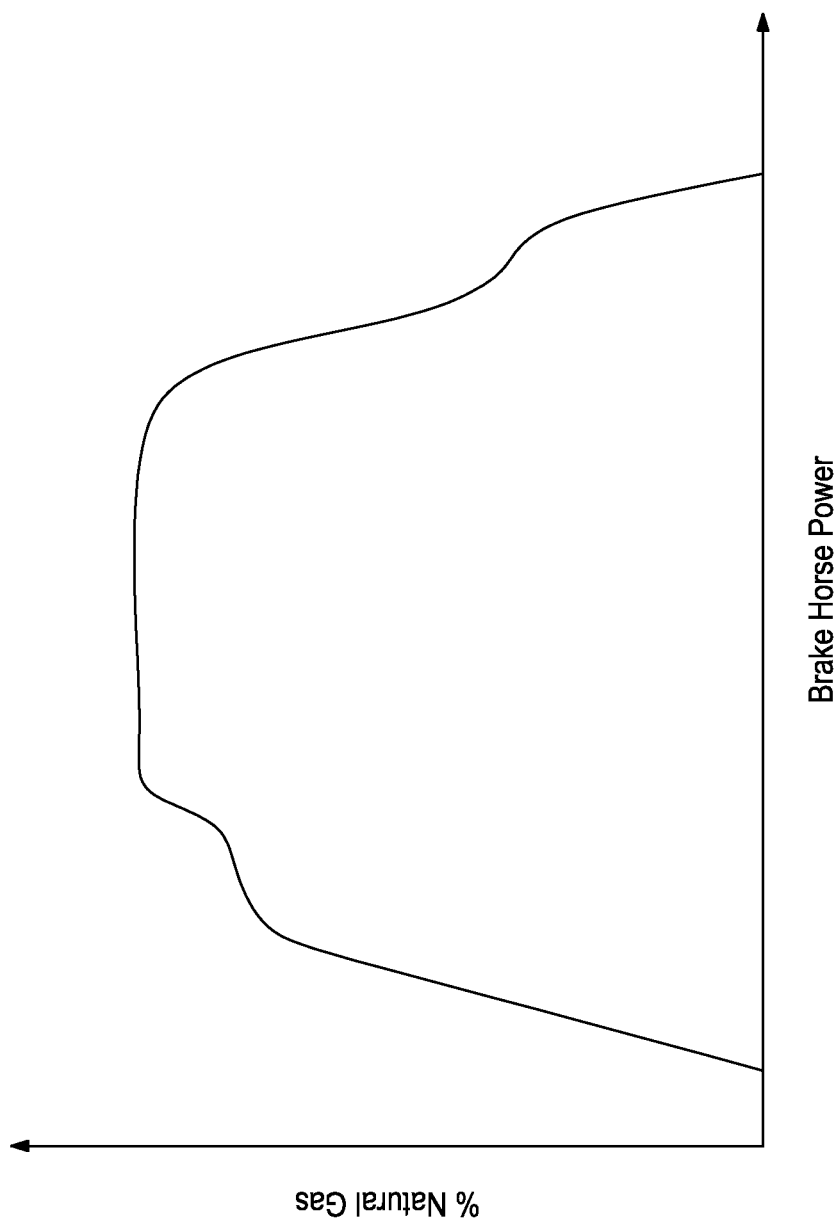
FIG. 2 provides an illustrative relationship between percent natural gas substitution and a brake horsepower of an engine.

The fuel consumption value may be converted to a diesel consumption value with an input of (4) a fuel composition. The fuel composition may be 100% diesel or a mixture of natural gas and diesel (or both may be calculated). The percent of natural gas substituted for diesel in the mixture may be calculated by the diesel consumption model or input directly based on the relationship between percent substitution versus an engine parameter. FIG. 2 provides an illustrative relationship between percent natural gas substitution and a BHP of the engine where the plot represents the maximum substitution of natural gas for diesel over a range of brake horsepowers. In some instances, the mixture of natural gas and diesel may be at maximum natural gas substitution. In some instances, the mixture of natural gas and diesel may be less than the maximum natural gas substitution. For example, lower grade natural gas may be run at less than the maximum natural gas substitution (e.g., about 1% to about 20% less) to account for impurities in the lower grade natural gas.

In some instances, a fuel (e.g., diesel or a natural gas/diesel mixture) may be chosen prior to or after calculating diesel consumption values for a dual-fuel engine configuration. Generally, natural gas/diesel mixtures provide lower diesel consumption because a percentage of the diesel is replaced with natural gas. However, other factors may influence the choice of fuel composition (e.g., availability, customer preference, and the like).

In some embodiments, inputs for a diesel consumption model described herein may be changed to analyze different dual-fuel engine configurations, different engine parameters, or both to identify dual-fuel engine configurations and engine parameters that provide economic value (i.e., lower diesel consumption). In some instances, the dual-fuel engine configurations and engine parameters employed at a well site may be those that provide for the lowest diesel consumption value for the chosen fuel composition. In some instances, availability of dual-fuel engine configurations or individual dual-fuel engines thereof may affect well site implementation. For example, a dual-fuel engine configuration employed at a well site may have economic value over some of the dual-fuel engine configurations but may not have the lowest diesel consumption value because the dual-fuel engine with the lowest diesel consumption value may not be available.

In some embodiments, modeling different dual-fuel engine configurations, different engine parameters, or both may be performed for different operating parameters. For example, a well site operation design may call for different operating parameters throughout the well site operation. Different dual-fuel engine configurations, different engine parameters, or both, may be modeled for all or some of the operating parameters for identifying dual-fuel engine configurations and engine parameters that provide economic value for the well site operation design.

In some embodiments, a diesel consumption model described herein may be applied in the field. For example, operating parameters may be changed as a result of in-the-field observations. Therefore, in some instances, engine parameters may be changed on-the-fly to account for changes in operating parameters where a diesel consumption model described herein may be implemented to minimize diesel consumption for the dual-fuel engine configurations. For example, when employing a dual-fuel engine configuration that includes two different dual-fuel engines (e.g., using two different pumps for transporting fluids down a wellbore), each dual-fuel engine may have preferred engine parameters and fuel compositions for a first set of operating parameters. Then, if the operating parameters are changed (e.g., increasing the wellbore pressure or increasing the fluid flow rate), a diesel consumption model may be used to recalculate a series of diesel consumption values and new engine parameters may be employed based on those diesel consumption values. In some instances, this method may be performed real-time with sensors to measure conditions and optionally computer control to change engine parameters.

In some instances, a diesel consumption model may be used to produce a guide (e.g., a chart, a plot, or a table) that may be used in the field to provide guidance for minimizing diesel consumption. For example, the engine parameters and operating parameters for a particular dual-fuel engine configuration may be interrelated. Then, the diesel consumption model may be used to calculate maximum natural gas substitution percentages for the given engine parameters and operating parameters. Then, as operating parameters and engine parameters change, the fuel composition may be changed to minimize diesel consumption.

Figure 3:
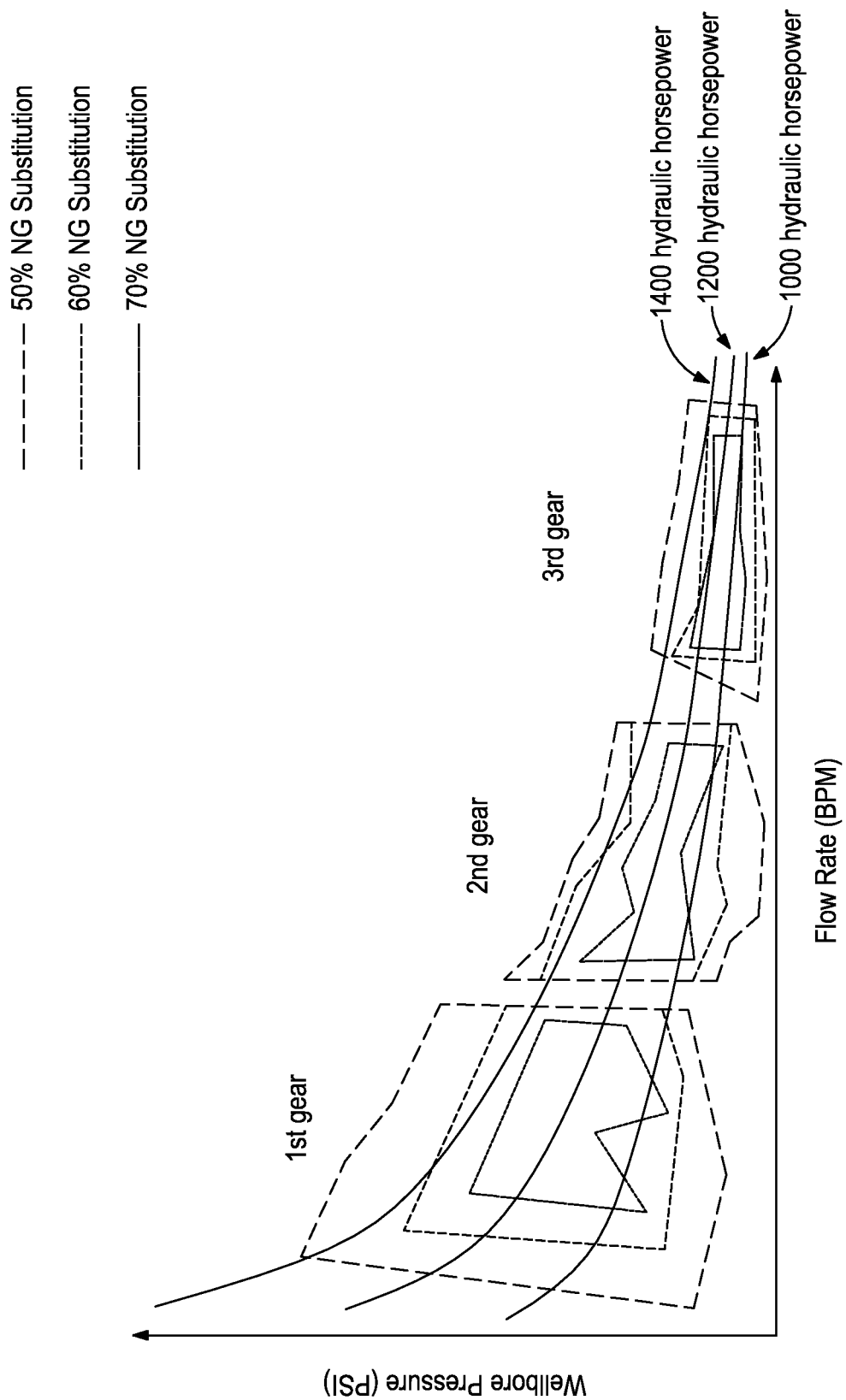
FIG. 3 provides an illustrative plot of operating parameters (wellbore pressure versus fluid flow rate) with engine parameters (hydraulic horsepower and gear) plotted thereon with an overlay of maximum natural gas substitution determined from the diesel consumption models described herein.

For example, FIG. 3 provides an illustrative plot of operating parameters (wellbore pressure versus fluid flow rate) with engine parameters (hydraulic horsepower and gear) plotted thereon. The diesel consumption model may then be used to calculate the maximum natural gas substitution percentages for the various operating parameters and engine parameters. In the plot of FIG. 3, outlines are used to represent where 50%, 60%, and 70% natural gas substitution is the maximum substitution. Therefore, as operating parameters and engine parameters change during a well site operation, the operator (or an automated system) may reference this guide to change the natural gas substitution percent to minimize diesel consumption. In some instances, the quality of the natural gas may be taken into account as described above.

In some instance, a diesel consumption model described herein may be used after a well site operation to analyze efficiency and provide guidance in future well site operations. The comparison between the modeled diesel consumption and the actual diesel consumption may be performed in a variety of ways. For example, the comparison may be for the entire well site operation and an efficiency may be calculated. In another example, an in-the-field guide described above may be produced where the actual data from each dual-fuel engine is overlayed with the guide for qualitative and quantitative comparison such as in FIG. 6.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

An exemplary embodiment described herein is Embodiment A: a method that includes calculating diesel consumption values for a plurality of dual-fuel engine configurations each independently comprising one or more dual-fuel engines, wherein the diesel consumption values are a function of (1) operating parameters for a well site operation, (2) a model of each of the one or more dual-fuel engines, (3) engine parameters for each of the one or more dual-fuel engines, and (4) a fuel composition for each of the one or more dual-fuel engines, wherein the fuel composition for each of the one or more dual-fuel engines is independently (a) 100% diesel or (b) a natural gas/diesel mixture; identifying one or more acceptable dual-fuel engine configurations from the plurality of dual-fuel engine configurations based at least in part on the diesel consumption values with lower values; and performing a portion of the well site operation with one of the acceptable dual-fuel engine configurations. Embodiment A may have one or more of the following additional elements in any combination: Element 1: wherein natural gas is present in the natural gas/diesel mixture is at an amount of about 20% less than a maximum natural gas substitution percentage to the maximum natural gas substitution percentage; Element 2: wherein the well site operation is a drilling operation, a stimulation operation, or a cementing operation; and Element 3: wherein the plurality of dual-fuel engine configurations are part of a pumping system (e.g., Element 1 in combination with Element 2; Element 1 in combination with Element 3; Element 2 in combination with Element 3; and Elements 1-3 in combination).

Another exemplary embodiment described herein is Embodiment B: a method that includes performing a well site operation at first operating parameters with a dual-fuel engine configuration operating at first engine parameters, wherein the dual-fuel engine configuration comprises one or more dual-fuel engines; changing the first operating parameters to second operating parameters and the first engine parameters to second engine parameters; determining a maximum natural gas substitution percentage in a fuel comprising a natural gas/diesel mixture for at least one of the dual-fuel engines at the second operating parameters and the second engine parameters; and changing a fuel composition supplied to the at least one of the dual-fuel engines based on the maximum natural gas substitution percentage. Embodiment B may have one or more of the following additional elements in any combination: Element 4: wherein the fuel composition changes from a first fuel composition to a second fuel composition, and wherein the second fuel composition comprises a natural gas/diesel mixture with natural gas being present at an amount of about 20% less than the maximum natural gas substitution percentage to the maximum natural gas substitution percentage; Element 5: the method further including producing a guide for the maximum natural gas substitution percentage as a function of a plurality of operating parameters and a plurality of engine parameters; and wherein determining the maximum natural gas substitution percentage uses the guide; Element 6: the method further including calculating the maximum natural gas substitution percentage in real-time at the well site; Element 7: wherein determining the maximum natural gas substitution percentage and changing a fuel composition supplied to the at least one of the dual-fuel engine are automated; Element 8: wherein the well site operation is a drilling operation, a stimulation operation, or a cementing operation; and Element 9: wherein the plurality of dual-fuel engine configurations are part of a pumping system (e.g., Element 4 in combination with one or more of Elements 5-9; Element 6 in combination with Element 7; Element 8 in combination with Element 9; Elements 6-9 in combination; and so on).

Yet another exemplary embodiment described herein is Embodiment C: a method that includes performing a well site operation with a dual-fuel engine configuration comprising one or more dual-fuel engines, wherein at least one dual-fuel engine uses a fuel comprising a natural gas/diesel mixture having an actual natural gas substitution percentage; calculating a maximum natural gas substitution percentage for the at least one dual-fuel engine as a function of (1) operating parameters for the well site operation, (2) a model of the at least one dual-fuel engine, and (3) engine parameters for the at least one dual-fuel engine; and comparing the actual natural gas substitution percentage and the maximum natural gas substitution percentage. Embodiment C may have one or more of the following additional elements in any combination: Element 10: wherein the actual natural gas substitution percentage changes during the well site operation; Element 11: wherein the well site operation is a drilling operation, a stimulation operation, or a cementing operation; and Element 12: wherein the plurality of dual-fuel engine configurations are part of a pumping system (e.g., Element 10 in combination with Element 11; Element 10 in combination with Element 12; Element 11 in combination with Element 12; and Elements 10-12 in combination).

To facilitate a better understanding of the embodiments of the present invention, the following examples of preferred or representative embodiments are given. In no way should the following examples be read to limit, or to define, the scope of the invention.

EXAMPLES

Example 1

A hypothetical wellbore operation (a fracturing job) was analyzed with a model described herein with two engine configurations (two different pumps with different dual-fuel engines) to determine the most economical option (i.e., least diesel consumption) for both 100% diesel and a diesel/natural gas mixture. In this hypothetical scenario, only baseline pumps were used (i.e., no swing pumps) for the wellbore operation.

Table 1 provides a tabular representation of the model inputs and calculated values for a Q10™ Pump (available from Halliburton Energy Services, Inc.). Table 2 provides a tabular representation of the model inputs and calculated values for an HT2000™ Pump Trailer.

TABLE 1

| Operating Parameters | |
|---|---|
| Average Job Pressure (psi) | 3000 |
| Average Job Rate (bpm) | 60 |
| Pump Time (hrs) | 100 |
| Idle Time Factor | 3 |
| Engine Parameter Inputs | |
| Pump Type | Q10 ™ Pump |
| Number of Pumps | 1 |
| Gear | 5 |
| Downhole Pumps | 1 |
| Engine Speed (rpm) | 1700 |
| Calculated Engine Values | |
| HHP | 596 |
| BHP | 772 |
| Pump Rate (bpm) | 8.11 |
| Idle Time (hrs) | 300 |
| Fuel Consumption Values | |
| Idle Fuel (gal/pmp-hr) | 3.95 |
| Pumping Fuel (gal/pmp-hr) | 43.2 |
| Total Idle Fuel (gal) | 1,184 |
| Total Pumping Fuel (gal) | 4,321 |
| Total Fuel (gal) | 5,504 |
| Max Natural Gas Substitution | 59% |
| Diesel Consumption Values | |
| Using 100% Diesel Fuel | 5,504 gal |
| Using Diesel/Natural Gas Mixture | 2,275 gal |

TABLE 2

| Operating Parameters | |
|---|---|
| Average Job Pressure (psi) | 3000 |
| Average Job Rate (bpm) | 60 |
| Pump Time (hrs) | 100 |
| Idle Time Factor | 3 |
| Engine Parameter Inputs | |
| Pump Type | HT2000 ™ Pump Trailer |
| Number of Pumps | 1 |
| Gear | 3 |
| Downhole Pumps | 1 |
| Engine Speed (rpm) | 1700 |
| Calculated Engine Values | |
| HHP | 364 |
| BHP | 540 |
| Pump Rate (bpm) | 4.95 |
| Idle Time (hrs) | 300 |
| Fuel Consumption Values | |
| Idle Fuel (gal/pmp-hr) | 3.95 |
| Pumping Fuel (gal/pmp-hr) | 35.1 |
| Total Idle Fuel (gal) | 1,184 |
| Total Pumping Fuel (gal) | 3,514 |
| Total Fuel (gal) | 4,697 |
| Max Natural Gas Substitution | 51% |
| Diesel Consumption Values | |
| Using 100% Diesel Fuel | 4,697 gal |
| Using Diesel/Natural Gas Mixture | 2,314 gal |

Figure 4:
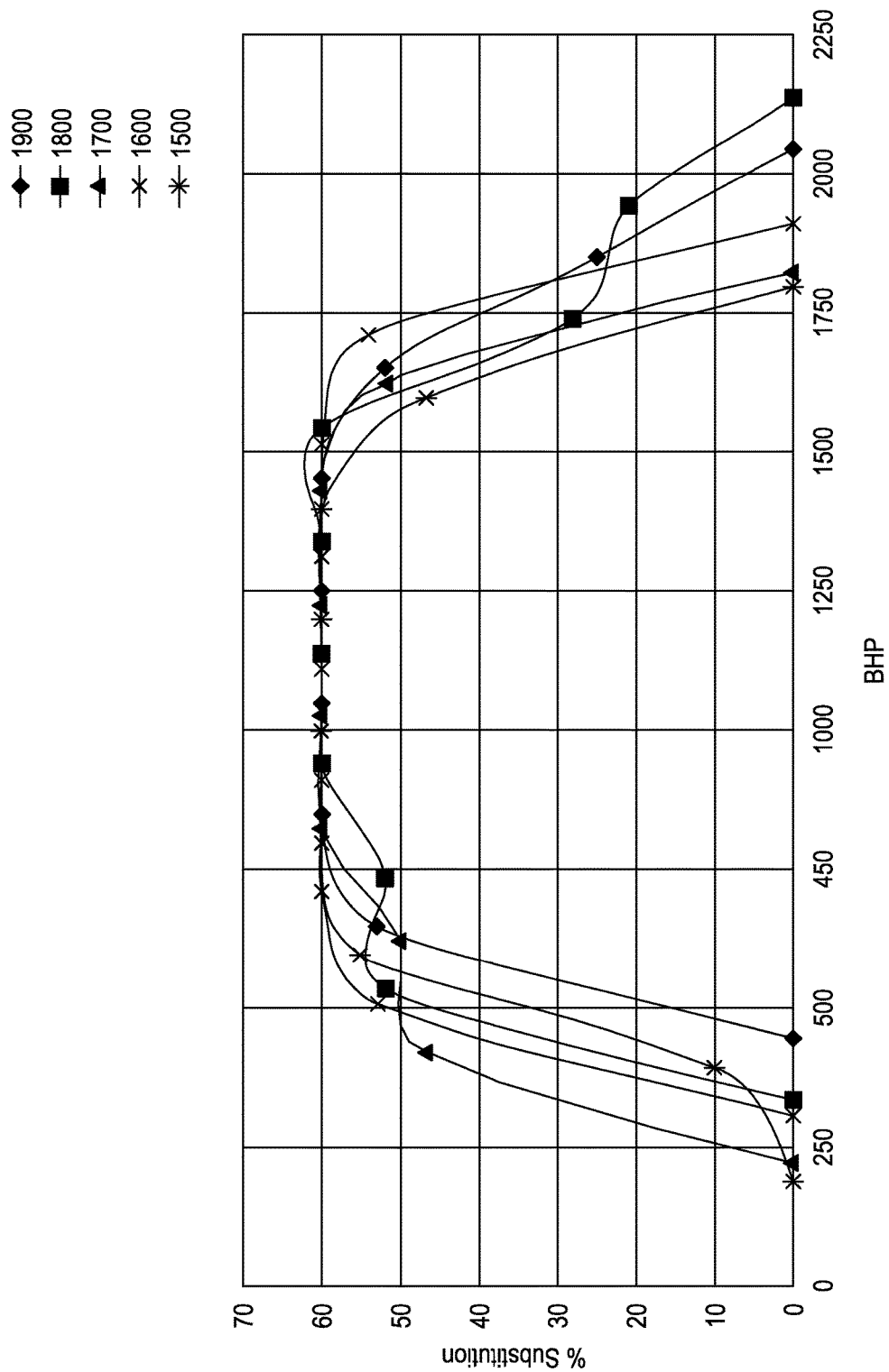
FIG. 4 provides a plot with curve fit of percent natural gas substitution versus a brake horsepower of an engine.

Regarding the model, the idle time is the (pump time)* (idle time factor). The HHP was calculated as wellbore pressure (units: psi) times pump rate (units: gallons per minute) divided by 1714 (conversion factor for HHP units of horsepower). A plot with curve fit of fuel consumption rate versus BHP (data measured experimentally) at various engine speeds (the plot corresponding to 1700 rpm used in this example) provides a horsepower unit fuel consumption rate (slope) and an internal parasitic fuel consumption rate (y-intercept) at various engine speeds. Finally, a plot with curve fit of percent natural gas substitution versus a brake horsepower of an engine at various engine speeds (the plot corresponding to 1700 rpm used in this example) (FIG. 4) was used to determine the maximum natural gas substitution value.

In comparing the two engine configurations, the HT2000™ Pump Trailer uses 17.2% less diesel than the Q10™ Pump for 100% diesel fuel. However, if a diesel/natural gas mixture is chosen as the fuel, the Q10™ Pump uses 1.7% less diesel than the HT2000™ Pump Trailer. Therefore, depending on the fuel chosen for the wellbore operation, either pump may provide an economic advantage.

Example 2

Figure 5:
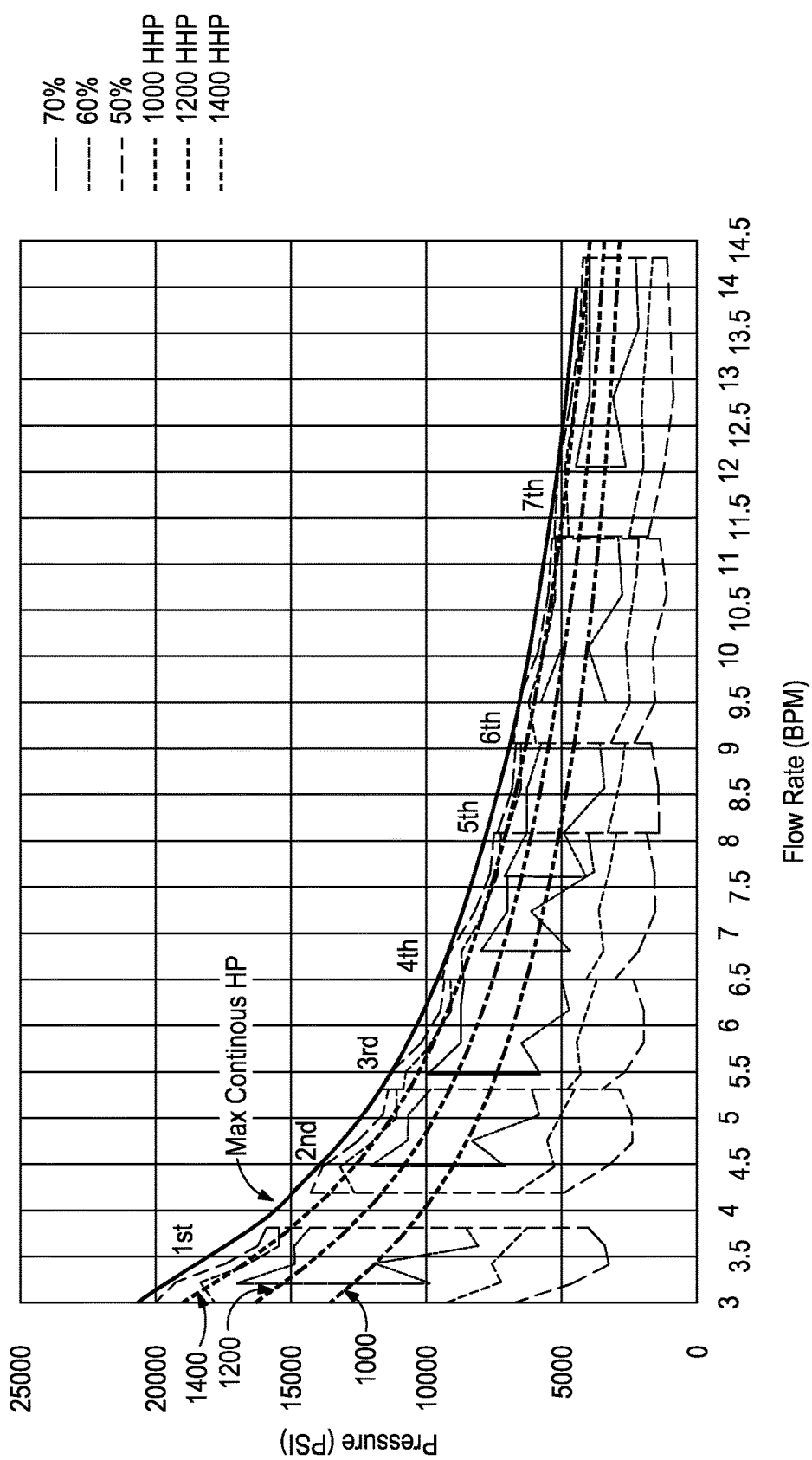
FIG. 5 provides an overlay plot of the maximum natural gas substitution with hydraulic horsepower for a Q10™ Pump as a function of flow rate and job pressure.

Using the basic model described in Example 1 the maximum natural gas substitution was overlayed for a plot of HHP for a Q10™ Pump as a function of flow rate and job pressure, FIG. 5. This plot may be used in the field to guide an operator (or an automated system) so that fuel composition may be changed to minimize diesel consumption for a diesel/natural gas mixture.

Example 3

Figure 6:
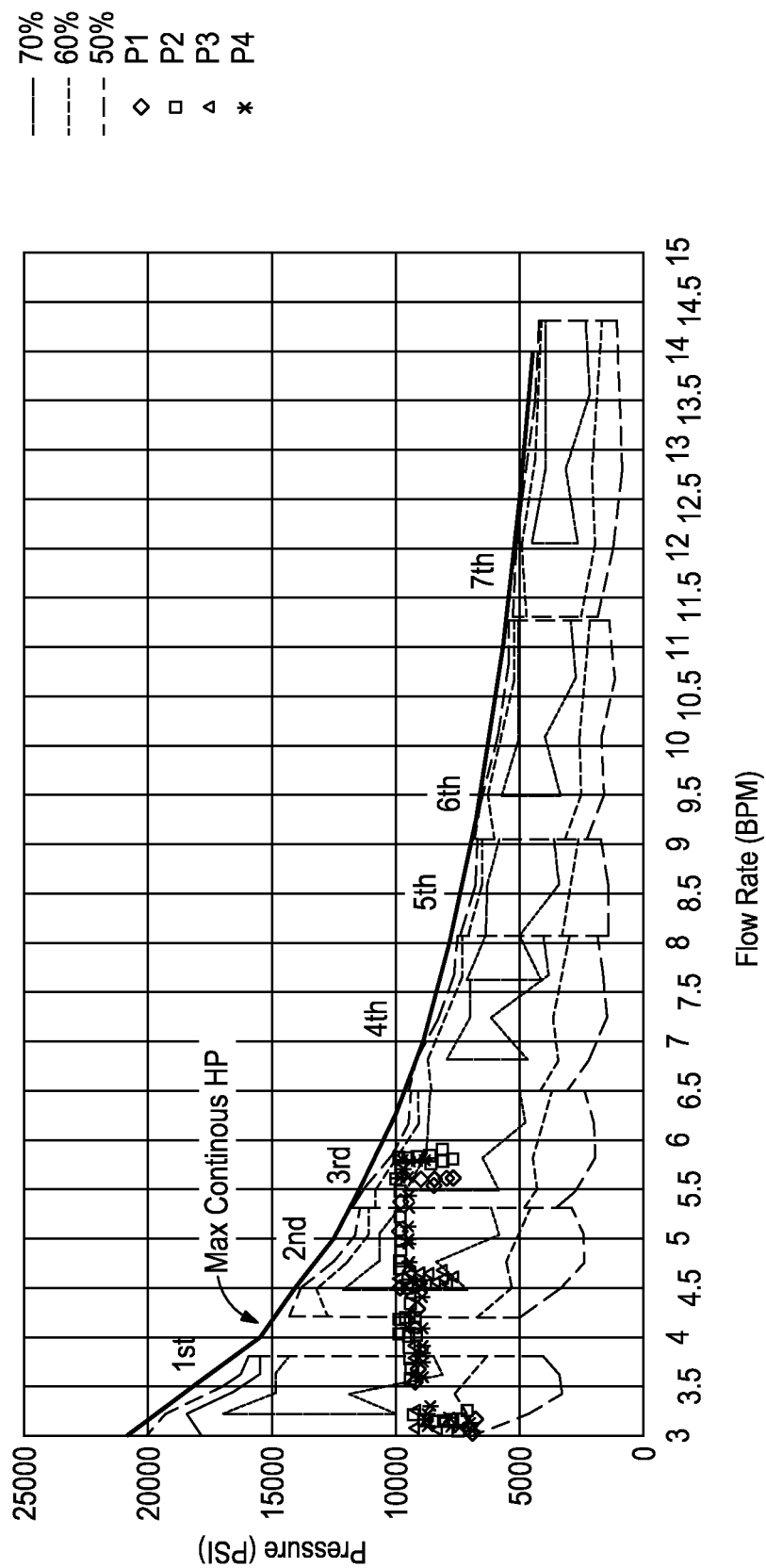
FIG. 6 provides an overlay of actual data for four Q10™ Pumps operated in the field with FIG. 5.

Using the plot of FIG. 5, the actual data for four Q10™ Pumps operated in the field was plotted to produce FIG. 6. This overlay can provide post-job analysis to determine preferred fuel compositions and increase efficiencies in future jobs. For example, the pumps at flow rates from around 3.8 to 4.2 bpm are at lower substitution rates. The best substitution is inside the green (inner) polygons. By increasing the flow rate of those pumps in the 3.8 to 4.2 bpm range to the 4.5 to 5.3 bpm range gets the substitution inside the 70% range indicated by the green (inner) polygons.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   calculating diesel consumption values for a plurality of dual-fuel engine configurations each independently comprising one or more dual-fuel engines, wherein the diesel consumption values are a function of (1) operating parameters for a well site operation, (2) a model of each of the one or more dual-fuel engines, (3) engine parameters for each of the one or more dual-fuel engines, and (4) a fuel composition for each of the one or more dual-fuel engines, wherein the fuel composition for each of the one or more dual-fuel engines is independently (a) 100% diesel or (b) a natural gas/diesel mixture; and
   identifying one or more acceptable dual-fuel engine configurations from the plurality of dual-fuel engine configurations based at least in part on the diesel consumption values with lower values; and
   performing a portion of the well site operation with one of the acceptable dual-fuel engine configurations.

2. The method of claim 1, wherein natural gas is present in the natural gas/diesel mixture is at an amount of about 20% less than a maximum natural gas substitution percentage to the maximum natural gas substitution percentage.

3. The method of claim 1, wherein the well site operation is a drilling operation, a stimulation operation, or a cementing operation.

4. The method of claim 1, wherein the plurality of dual-fuel engine configurations are part of a pumping system.

5. A method comprising:
   calculating diesel consumption values for a plurality of dual-fuel engine configurations each independently comprising one or more dual-fuel engines, wherein the diesel consumption values are a function of (1) operating parameters for a well site operation, (2) a model of each of the one or more dual-fuel engines;
   identifying one or more acceptable dual-fuel engine configurations from the plurality of dual-fuel engine configurations based at least in part on the diesel consumption values with lower values;
   performing a well site operation at first operating parameters with one of the acceptable dual-fuel engine configurations operating at first engine parameters, wherein the acceptable dual-fuel engine configuration comprises one or more dual-fuel engines;
   changing the first operating parameters to second operating parameters and the first engine parameters to second engine parameters;
   determining a maximum natural gas substitution percentage in a fuel comprising a natural gas/diesel mixture for at least one of the dual-fuel engines at the second operating parameters and the second engine parameters; and
   changing a fuel composition supplied to the at least one of the dual-fuel engines based on the maximum natural gas substitution percentage.

6. The method of claim 5, wherein the fuel composition changes from a first fuel composition to a second fuel composition, and wherein the second fuel composition comprises a natural gas/diesel mixture with natural gas being present at an amount of about 20% less than the maximum natural gas substitution percentage to the maximum natural gas substitution percentage.

7. The method of claim 5 further comprising:
   producing a guide for the maximum natural gas substitution percentage as a function of a plurality of operating parameters and a plurality of engine parameters; and wherein determining the maximum natural gas substitution percentage uses the guide.

8. The method of claim 5 further comprising:
   calculating the maximum natural gas substitution percentage in real-time at the well site.

9. The method of claim 5, wherein determining the maximum natural gas substitution percentage and changing a fuel composition supplied to the at least one of the dual-fuel engine are automated.

10. The method of claim 5, wherein the well site operation is a drilling operation, a stimulation operation, or a cementing operation.

11. The method of claim 5, wherein the plurality of dual-fuel engine configurations are part of a pumping system.

12. A method comprising:
   calculating diesel consumption values for a plurality of dual-fuel engine configurations each independently comprising one or more dual-fuel engines, wherein the diesel consumption values are a function of (1) operating parameters for a well site operation, (2) a model of each of the one or more dual-fuel engines;

identifying one or more acceptable dual-fuel engine configurations from the plurality of dual-fuel engine configurations based at least in part on the diesel consumption values with lower values;

performing a well site operation with one of the acceptable dual-fuel engine configurations comprising one or more dual-fuel engines, wherein at least one dual-fuel engine uses a fuel comprising a natural gas/diesel mixture having an actual natural gas substitution percentage;

calculating a maximum natural gas substitution percentage for the at least one dual-fuel engine as a function of (1) operating parameters for the well site operation comprising at least one selected from the group consisting of a pump rate, a pump time, a wellbore pressure, and the pump time relative to an idle time, (2) the model of the at least one dual-fuel engine, and (3) engine parameters for the at least one dual-fuel engine;

comparing the actual natural gas substitution percentage and the maximum natural gas substitution percentage; and adjusting the actual natural gas substitution percentage to be about 1% to about 20% less than the maximum natural gas substitution range.

13. The method of claim 12, wherein the actual natural gas substitution percentage changes during the well site operation.

14. The method of claim 12, wherein the well site operation is a drilling operation, a stimulation operation, or a cementing operation.

15. The method of claim 12, wherein the plurality of dual-fuel engine configurations are part of a pumping system.

* * * * *